(12) United States Patent
Carrerot et al.

(10) Patent No.: US 8,991,327 B2
(45) Date of Patent: Mar. 31, 2015

(54) DEVICE FOR SIGNALING HEATING, AND MECHANICAL SYSTEM EQUIPPED WITH SUCH A DEVICE

(71) Applicants: SKF Aerospace France, Saint-Vallier-sur-Rhone (FR); SKF Aeroengine France, Montigny le Bretonneux (FR)

(72) Inventors: Herve Carrerot, Vicq (FR); Yves Maheo, Anneyron (FR)

(73) Assignee: SKF Aerospace France, Saint-Vallier-sur-Rhone (FR)

( * ) Notice: Subject to any disclaimer, the term of this patent is extended or adjusted under 35 U.S.C. 154(b) by 299 days.

(21) Appl. No.: 13/705,583

(22) Filed: Dec. 5, 2012

(65) Prior Publication Data

US 2013/0139748 A1 Jun. 6, 2013

(30) Foreign Application Priority Data

Dec. 6, 2011 (FR) ..................................... 11 61231

(51) Int. Cl.
| | |
|---|---|
| *G01K 5/28* | (2006.01) |
| *G01K 11/00* | (2006.01) |
| *G01D 7/00* | (2006.01) |
| *F16N 17/00* | (2006.01) |
| *F16N 11/10* | (2006.01) |

(52) U.S. Cl.
CPC ................. *G01D 7/005* (2013.01); *F16N 11/10* (2013.01); *F16N 17/00* (2013.01); *G01K 5/28* (2013.01)
USPC ........... 116/220; 116/216; 374/153; 374/187; 374/201

(58) Field of Classification Search
CPC ......... F16N 11/00; F16N 11/10; F16N 17/00; F16N 17/02; G01D 7/00; G01D 7/005; G01K 5/28; G01K 5/30; G01K 5/32; G01K 5/42; G01K 5/44; G01K 11/00

USPC .......... 116/216, 220; 374/153, 154, 187, 190, 374/191, 201, 202

See application file for complete search history.

(56) References Cited

U.S. PATENT DOCUMENTS 2,851,984 A * 9/1958 Verhunce ....................... 116/106
3,727,045 A * 4/1973 Warren et al. ............. 246/169 A
(Continued)

FOREIGN PATENT DOCUMENTS

| FR | 2911168 A1 | 7/2008 | |
|---|---|---|---|
| JP | 01097130 A * | 4/1989 | ............... H02H 5/04 |
| WO | 2008/107579 A2 | 9/2008 | |

OTHER PUBLICATIONS

French Search Report, dated Jun. 28, 2012, which issued during the prosecution of French Patent Application No. 1161231.

*Primary Examiner* — R. A. Smith
(74) *Attorney, Agent, or Firm* — Troutman Sanders LLP

(57) ABSTRACT

A signaling device for signaling heating in a mechanical system susceptible to undergo contact heating during operation. The signaling device includes a body containing a thermally triggered charge generating combustion gas, ignition of the charge able to be triggered under the effect of a predetermined heat contribution, from a heating area of the body toward the charge, or under the action of an ignition command, a reservoir containing a fluid, and delivery means delivering pressurized fluid outside the reservoir through the action, directly or through an intermediate member moving in the reservoir, of the combustion gases. The signaling device also comprises at least one visual signaling element for visually signaling combustion of the charge, the visual signaling element being visible at an outer peripheral area of the signaling device after combustion of the charge. The invention also relates to a mechanical system equipped with at least one such signaling device.

20 Claims, 3 Drawing Sheets

(56) References Cited

U.S. PATENT DOCUMENTS

| | | | | |
|---|---|---|---|---|
| 3,817,204 A | * | 6/1974 | Schittek | 116/216 |
| 4,034,698 A | * | 7/1977 | Durand | 116/216 |
| 5,534,090 A | * | 7/1996 | Leining | 149/15 |
| 6,096,997 A | * | 8/2000 | Shirk | 219/260 |
| 2010/0101442 A1 | | 4/2010 | Gauthier et al. | |
| 2013/0140044 A1 | * | 6/2013 | Carrerot | 169/7 |

* cited by examiner

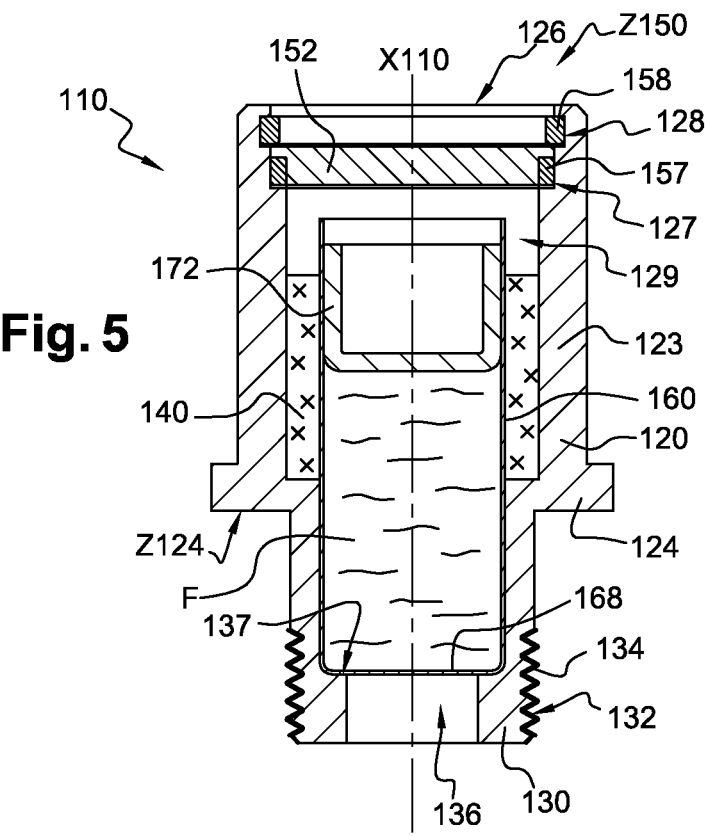

DEVICE FOR SIGNALING HEATING, AND MECHANICAL SYSTEM EQUIPPED WITH SUCH A DEVICE

CROSS REFERENCE TO RELATED APPLICATIONS

The present application claims priority to French Application No. 1161231 filed Dec. 6, 2011. This reference is incorporated herein by reference in its entirety.

BACKGROUND

The present invention relates to a device for signaling heating in a mechanical system, for example an anti-friction rolling bearing, main bearing or ball joint. The invention also relates to a mechanical system equipped with such a device. The invention relates to the field of security devices, in particular in the aeronautic maintenance field.

Mechanical systems of the rolling bearing, main bearing or ball joint type are commonly incorporated into all types of automobile, railroad, aeronautic or industrial machine equipment. For example, the mechanical system can be a ball bearing incorporated into an aeronautical device, such as a helicopter rotor.

In a known manner, such a mechanical system can undergo heating during operation. Beyond a critical temperature, certain component elements of the system can be irreparably damaged. The operation of the equipment into which the system is incorporated is then hindered, or even abruptly stopped. In certain cases, such a malfunction can therefore cause a serious accident.

In order to prevent or slow the heating of mechanical systems, a number of lubrication devices are known. Furthermore, the mechanical system can be provided with signaling devices, such as temperature sensors, making it possible to anticipate or signal critical heating.

International Publication WO/2008/107579 describes a mechanical system equipped with an autonomous device for injecting a fluid, in particular a lubrication or cooling fluid, into the system in case of heating. The device comprises a thermally triggered pyrotechnic charge generating combustion gas arranged in a housing. The fluid is contained in a reservoir separated from the charge by a moving piston on the one hand, and from the system by a membrane on the other hand. By reaching a predetermined ignition temperature, the charge undergoes combustion and the generated gases pressurize the fluid in the reservoir. The membrane breaks under the pressure from the fluid, which is then injected into the mechanical system. However, the triggering of the charge is not easily detectable from outside the device or system, for example by a maintenance operator, without using expensive electronic means.

The aim of the present invention is to propose a device for signaling critical heating that has been reached or is about to be reached, by a mechanical system. In particular, the invention targets a device that performs well and is reliable under demanding operating conditions, while being inexpensive and easy to implement.

SUMMARY

To that end, the invention relates to a signaling device for signaling heating in a mechanical system susceptible to undergo contact heating during operation, for example an anti-friction bearing, a main bearing or a ball joint, the signaling device having at least:

a body containing a thermally triggered charge generating combustion gas, ignition of the charge being able to be triggered under the effect of a predetermined heat contribution, from a heating area of the body toward the charge, or under the action of an ignition command, a reservoir containing a fluid, and delivery means for delivering pressurized fluid outside the reservoir through the action, directly or through an intermediate member moving in the reservoir, of the combustion gases.

According to the invention, the signaling device also includes at least one visual signaling element for visually signaling combustion of the charge, the visual signaling element being visible at an outer peripheral area of the signaling device after combustion of the charge.

The invention thus makes it possible to signal triggering of the charge visually, corresponding to heating of the mechanical system beyond a predetermined critical temperature, without requiring expensive and complex electronic means. Specifically, the mechanical system may undergo heating contact between its component elements during operation. The composition of the charge, as well as the configuration of the other component elements of the device, may be adapted so that the ignition of the charge occurs before the system reaches the critical temperature, or when that critical temperature is reached. Visual signaling is effective, inexpensive and practical in the context of a maintenance operation.

According to other features of the device according to the invention, considered alone or in combination:

The visual signaling element is a part of the body deformable under the action of pressure inside the body, the deformable part being pushed toward the outside of the body in the peripheral area by the combustion gases.

The visual signaling element is a window arranged in the peripheral area, the charge and/or the combustion gases being visible through the window.

The signaling element is made from a heat-sensitive material that changes color in contact with the combustion gases.

The visual signaling element is a capsule of paint or colored ink arranged in the body, at a window incorporated into the body in the peripheral area, the capsule breaking against the window under the pressure, either direct or through a moving element, from the combustion gases.

The delivery means for delivering fluid outside the reservoir are inserted between the reservoir and the peripheral area and the visual signaling element is the fluid that is released at the peripheral area after combustion of the charge.

The fluid is a paint or a colored ink.

The device comprises a second reservoir containing a second fluid, and secondary delivery means for delivering the second pressurized fluid outside the second reservoir through the action, direct or through a second intermediate member movable in the second reservoir, of the combustion gases.

The signaling device is autonomous, the ignition of the charge being able to be triggered only under the effect of a heat contribution, from a heating area of the body, toward the charge.

The delivery means for delivering the pressurized fluid outside the reservoir comprise a non-fragmentable membrane, which initially closes off the reservoir and breaks when the pressure of the fluid in the reservoir exceeds a predetermined pressure threshold.

The signaling device has fastening means for fastening the signaling device to a mechanical system, the fastening means comprising at least one sleeve provided with an outer thread coated with an anti-loosening adhesive film.

The fastening means are adapted to put the reservoir in fluid communication with the mechanical system and/or to position the body against the mechanical system at the heating area.

The injection sleeve is made up of a material having a 0.2% deformation yield strength $Re_{0.2}$ comprised between 500 and 700 MPa on the one hand, and a tensile strength Rmax comprised between 700 and 900 MPa on the other hand.

The invention also relates to a mechanical system, susceptible to undergo contact heating during operation, for example an anti-friction bearing, a main bearing, or a ball joint, wherein the system is equipped with at least one signaling device as described above.

Advantageously, at least one positive braking element cooperating with a signaling device may be integrated into the mechanical system.

The invention also relates to a mechanical system, susceptible to undergo contact heating during operation, for example an anti-friction bearing, a main bearing or a ball joint, wherein the system is equipped with at least one signaling device as described above, the signaling device comprising means for fastening the device to a mechanical system, the fastening means comprising at least one sleeve provided with an outer thread coated with an anti-loosening adhesive film, the sleeve of the device being screwed into a tapped orifice formed in the mechanical system, the tapped orifice preferably being formed in a part of the system made from a steel having a tensile strength comprised between 2400 and 2600 megapascals, in particular approximately 2500 MPa.

Advantageously, at least one positive braking element cooperating with a signaling device may be integrated into the mechanical system. The positive braking element may be of the sheet metal brake or lockwire type.

BRIEF DESCRIPTION OF THE DRAWINGS

The invention will be better understood upon reading the following description, provided solely as a non-limiting example and done in reference to the appended drawings, in which:

FIG. 5 a cross-sectional view similar to FIG. 2 of a device according to an example of the invention;

FIG. 6 a cross-sectional view similar to FIG. 2 of a device according to a third embodiment of the invention.

DETAILED DESCRIPTION

Figure 1:
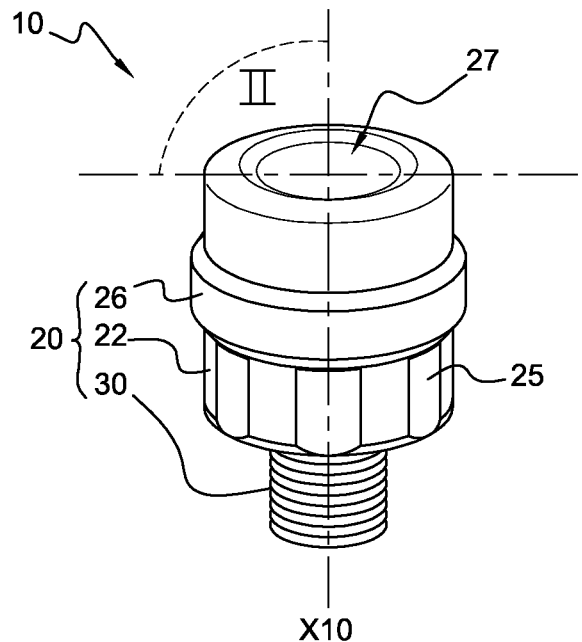
FIG. 1 is a perspective view of a device for signaling heating, said device being according to the invention.
Figure 2:
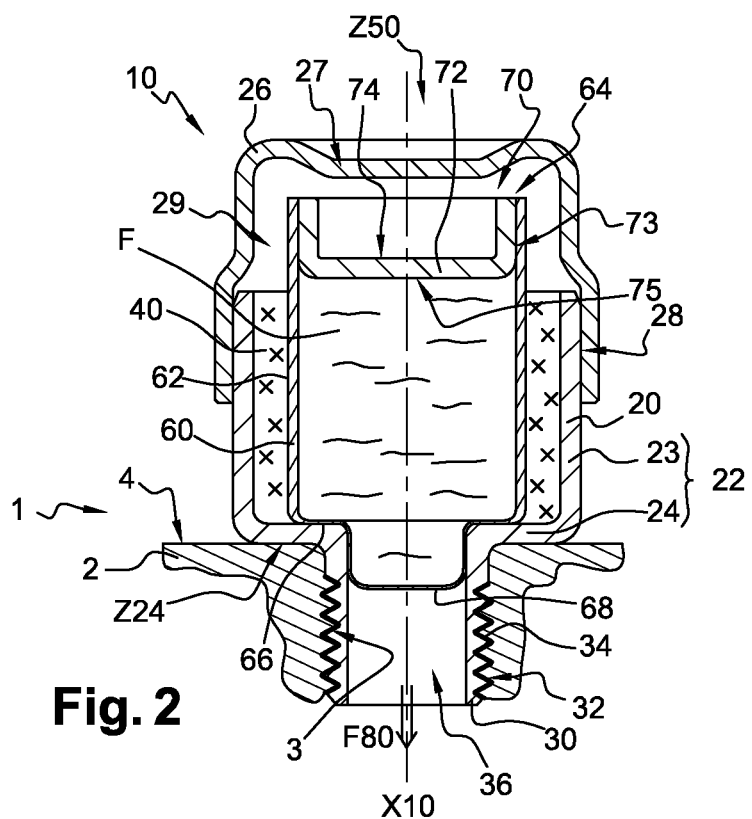
FIG. 2 is an axial cross-sectional view of the device in plane II of FIG. 1, equipping a mechanical system, partially shown, also according to the invention.
Figure 3:
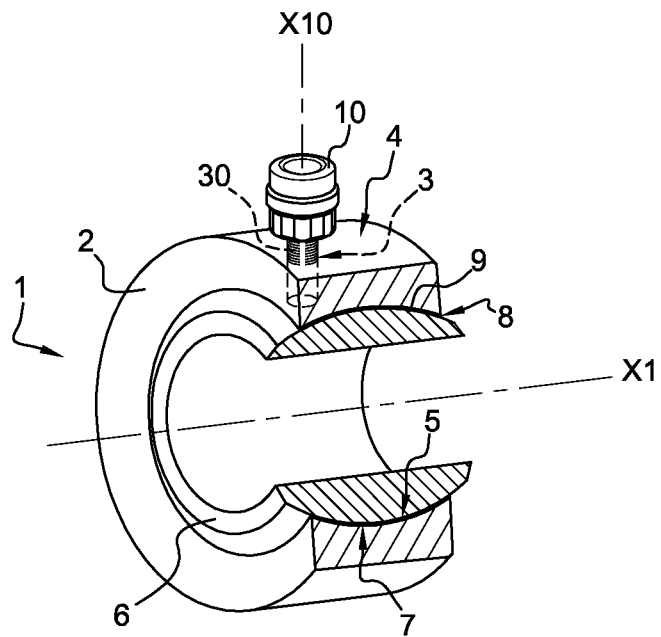
FIG. 3 is a smaller scale perspective view of the device and the system of FIG. 1.

FIGS. 1 to 3 show an autonomous device 10 according to the invention for signaling heating and delivery of a fluid F.

More specifically, the device 10 is a miniaturized cartridge designed to equip a mechanical system 1, also according to the invention, susceptible to undergo heating. The system 1 is partially shown in FIG. 2 for simplification purposes on the one hand, and is fully shown in FIG. 3 on the other hand.

In the example of FIGS. 2 and 3, the system 1 is of the mechanical ball joint type, with an outer ring 2 and an inner ring 6, which are respectively stationary and movable during operation. The outer ring 2 has an annular outer surface 4 centered on an axis X1, as well as a concave inner surface 5 of revolution around the axis X1. The inner ring 6 has an outer surface 7 with a tapered spherical profile and which forms a ball joint connection, at a sliding interface 8, with the inner surface 5 of the ring 2. An orifice 3 that is at least partially tapped passes through the ring 2, connecting the outer surface 4 and the inner surface 5 of that ring 2. Preferably, the rings 2 and 6 are made from a steel with a very high hardness, having a tensile strength comprised between 2400 and 2600 megapascals (MPa), still more preferably approximately 2500 MPa.

In practice, the movements within the ball joint 1 are a rotational movement of the ring 6 around the axis X1 relative to the ring 2 on the one hand, and a pivoting movement of that ring 6, the central axis of which is then inclined relative to the axis X1, on the other hand. The repeated sliding under forces at the interface 8 cause contact heating, at a temperature that is for example approximately 110° C. to 150° C. The failure mode of the ball joint 1 is the seizing, corresponding to a transfer of material between the two rings 2 and 6, until welding occurs. Lubrication is therefore done at the interface 8 to dissipate the contact heating. Preferably, a strip 9 of self-lubricating fabric is arranged to that end at the interface 8. Alternatively, the interface 8 can comprise fluid lubrication of the grease or oil type.

The strip 9 is for example made from polytetrafluoroethylene (PTFE) polymer and glass fibers arranged in a polymer matrix. The strip 9 can be rigidly attached to the surface 7 of the moving ring 6 and rub against the surface 5 of the ring 2. This friction causes gradual wear of the strip 9, with the tearing out of material particles, in particular through filamentation of the PTFE, fragmentation of the fibers and crumbling of the matrix. The debris torn out spreads at the interface 8 and the wear continues until the strip 9 is completely eliminated. At this stage, the metal-on-metal contact of the rings 2 and 6 causes seizing and end-of-life of the ball joint 1. Before the seizing, the temperature at the interface 8 is for example approximately 100° C. to 200° C., which corresponds to the critical temperature of the ball joint 1. This critical temperature is easy to determine through prior tests, for example using a thermal camera.

During operation of the ball joint 1, the cartridge 10 aims to protect the surfaces 5 and 7 and the interface 8 from heating. To that end, the fluid F is on the one hand initially contained in the cartridge 10 at rest, and on the other hand injected from the cartridge 10 toward the ball joint 1, under certain operating conditions, during operation of the ball joint 1 and the cartridge 10. The cartridge 10 also aims to signal heating beyond the critical temperature using visual means, in particular identifiable by a maintenance operator examining the ball joint 1.

In one alternative not shown, the system 1 may be another mechanical system susceptible to undergo heating, for example an anti-friction rolling bearing or a main bearing.

According to another alternative not shown, the cartridge 10 may be positioned at another location of the system 1, for example on a front surface or a housing of a tip body.

The cartridge 10 comprises a body 20, a signaling element 27, a sleeve 30 for fastening the cartridge 10 to the ball joint 1, a thermally triggered charge 40 that may generate combustion gas, a reservoir 60 adapted to contain the fluid F, means 68 for delivering the fluid F outside the reservoir 60, as well as intermediate means 70 for compressing the fluid F in the reservoir 60. The cartridge 10 is generally axially symmetrical around a central axis X10.

The body 20 is centered on the axis X10 and comprises a base 22, a cover 26, and the sleeve 30 secured to the base 22. The base 22 comprises a cylindrical wall 23 centered on the axis X10 and a radial wall 24 perpendicular to the axis X10. Optionally, the wall 23 has an outer surface provided with ribs 25 facilitating handling of the body 20. A heating area Z24 is delimited on the outer side of the wall 24, around the sleeve 30. Said area Z24 is provided to be positioned in contact with the outer surface 4 of the ball joint 1, so that a heat transfer can occur through the wall 24 from the interface 8 of the ball joint 1 toward the charge 40. The base 22 is preferably made from a metal material with a high thermal conductivity, such as a copper, zinc and/or aluminum alloy, for example brass.

The cover 26 forms a basin, whereof the section in a plane containing the axis X10 generally forms an inverted U. The base 22 and the cover 26 together delimit a housing 29 formed inside the body 20. Arranged in the housing 29 are the charge 40, the means 70, and the reservoir 60 containing the fluid F, the rest initially being filled with non-pressurized air. The base 22 and the cover 26 are assembled to one another and secured at a junction area 28, for example by welding or gluing. In the example of FIG. 2, the wall of the cover 26 partially covers the wall 23 of the base 22. As a non-limiting example, the maximum diameter of the body 20 at the junction area 28 is approximately 20 mm. The cover 26 can be made from a less expensive material than the base 22.

In particular, the cover 26 comprises, at its apex, i.e. at the hollow portion of the U, a portion 27 that can be deformed under the effect of a pressure inside the body 20, when the combustion gas of the charge 40 is diffused in the housing 29. Advantageously, the portion 27 is formed in an outer peripheral area Z50 of the cartridge 10. The strength of the portion 27 may be reduced under the effect of a heat treatment prior to assembling the cover 26 on the base 22, or by decreasing the thickness of the portion 27 relative to the rest of the cover 26, or using any other means suited to this application. Alternatively, the portion 27 may be an element fastened on the cover 26 in the area Z50, for example an element made from a plastic that is plastically deformable without breaking under the pressure and temperature of the combustion gases of the charge 40.

Thus, the combustion of the charge 40 can be detected visually from outside the cartridge 10, simply by examining the area Z50 during a maintenance operation, the portion 27 then being deformed toward the outside of the body 20. In other words, the portion 27 constitutes an element for visually signaling combustion of the charge 40, said visual signaling element being visible at the outer peripheral area Z50 of the cartridge 10 after combustion of the charge 40.

The sleeve 30 is secured to the base 22 and protrudes from the wall 24, on the side opposite the cover 26. More specifically, the sleeve 30 forms a cylindrical wall centered on the axis X10 and having an outer thread 32 on the one hand, and an inner bore on the other hand delimiting a duct 36 for delivering the fluid F outside the cartridge 10. As one non-limiting example, the outer diameter of the sleeve 30 is approximately 6 mm. In order to ensure optimal fastening of the cartridge 10 to the ball joint 1, the outer thread 32 is coated with an anti-loosening adhesive film 34, then screwed into the corresponding orifice 3 of the ball joint 1, with a controlled torque. The orifice 3, specifically provided to receive the sleeve 30, is at least partially tapped. As one non-limiting example, the film 34 applied on the thread 32 may be a glue or an adhesive paste with a strong adhesive power, in particular a cyanoacrylate glue.

The body 20, and in particular the sleeve 30, are configured to ensure optimal operating efficiency of the cartridge 10 and the ball joint 1. In particular, the material and expense of the area Z24, the material and the dimensions of the sleeve 30, the dimensional precision and the strength of the thread 32, the nature and quantity of film 34 applied on the thread 32, and the tightening torque of the threaded sleeve 30 in the orifice 3 of the ball joint 1 are particularly important for the implementation of the cartridge 10. The sleeve 30 makes it possible to fasten the cartridge 10 to the ball joint 1 while ensuring satisfactory strength of the cartridge 10 with respect to the vibrational stresses transmitted to it by the ball joint 1, satisfactory sealing of the ball joint 1 at the orifice 3, and delivery of the fluid F into a specific area of the interface 8 of the ball joint 1. The area Z24 allows rapid and precise ignition of the charge 40 in response to critical heating of the ball joint 1.

In this way, the cartridge 10 has a reduced response time, ensures rapid intervention in the event of heating of the ball joint 1, and limits the damage potentially suffered by the component elements of the ball joint 1 under the effect of critical heating. The ignition of the charge can be triggered under the effect of a predetermined heat contribution relative to the critical temperature of the ball joint 1, as outlined below.

Advantageously, the sleeve 30 is made from a material having a 0.2% deformation yield strength $Re_{0.2}$ comprised between 500 and 700 MPa, preferably between 550 and 650 MPa, still more preferably approximately 600 MPa. Furthermore, the material of the sleeve has a tensile strength Rmax comprised between 700 and 900 MPa, preferably between 750 and 850 MPa, still more preferably approximately 800 MPa. Such mechanical characteristics can for example be obtained with a steel alloy, with or without thermal treatment. Thus, the sleeve 30 and its thread 32 have a satisfactory strength with respect to the mechanical, vibrational and thermal stresses undergone in contact with the ball joint 1.

Complementarily, a positive braking element, not shown, may be integrated into the system 1. This element is for example of the sheet metal brake or lockwire type and cooperates with the cartridge 10, so as to avoid unscrewing of said cartridge 10 under the action of the vibrations of the system 1 during operation.

The reservoir 60 comprises a cylindrical wall 62 that is centered on the axis X10 and extends between an open end provided with a circular opening 64 and a closed end formed by a radial wall 66. Preferably, the reservoir 60 suitable for storing the fluid F is made from a material with a lower thermal conductivity than the material of the body 20 receiving the charge 40. In this way, the fluid F to be injected can be preserved from any heating that may come from heating of the ball joint 1 to be protected, at the heating area Z24. For example, the reservoir 60 may be made from a light material, such as a plastic.

A membrane 68, for example made up of a frangible plastic or metal film, is formed on the wall 66 of the reservoir 60. When the reservoir 60 is positioned on the base 22, the wall 66 presses on the inner surface of the wall 24, while the membrane 68 protrudes inside the duct 36, perpendicular to the axis X10. The membrane 68 is then located in the volume delimited by the contours of the thread 32, advantageously being brought closer to the outlet end of the duct 36 and the interface 8 of the ball joint 1. Alternatively, the membrane 68 may be formed in the same plane as the wall 66, or may completely replace the wall 66. The membrane 68 performs a first function of sealing the reservoir 60 and a second function of delivering, after rupture, fluid F outside the reservoir 60. The membrane 68 and the duct 36 constitute the delivery means for delivering the fluid F outside the reservoir. The sleeve 30 may be described as an injection sleeve, inasmuch as it is passed through by the fluid F when the latter is delivered.

Preferably, the membrane 68 is non-fragmentable in case of rupture, in other words configured to tear without fragments under the pressurization force of the fluid F in the reservoir 60. In fact, the migration of membrane fragments 68 toward the interface 8 of the ball joint 1 via the duct 36 would risk damaging the system 1.

In the example of FIG. 2, the compression means 70 are inserted between the fluid F and the housing 29 containing the charge 40. These means 70 are necessary when the mixture of the combustion gases with the fluid F to be injected is troublesome and/or when the injection of the mixture of combustion gas and fluid F can be problematic. More specifically, the means 70 comprise a piston 72 initially positioned in the reservoir 60 at the opening 64. The piston 72 is provided with a lateral cylindrical wall 73 bearing against the wall 62, on a first side 74 oriented toward the housing 29 and with a second side 75 oriented toward the inside of the reservoir 60 and the fluid F. The second side 75 is initially positioned in contact with the fluid F, which is then subjected to a zero or low pressure. When combustion gases are released from the charge 40, the pressure increases in the housing 29, destroying the equilibrium between the pressure exerted by the fluid F on the side 75 and the pressure exerted by the gases on the side 74. The piston 72 moves in the reservoir 60 with the wall 73, which slides against the wall 62, compressing the fluid F until the membrane 68 breaks. Then, the piston 72 continues to push into the reservoir 60, with a flow F80 of the fluid F that escapes the reservoir 60 through the pierced membrane 68, toward the duct 34 and the interface 8 of the ball joint 1.

In an alternative not shown in FIGS. 1 and 2, the means 70 may comprise a deformable membrane, or any other element suited for this application.

The fluid F may be a lubrication, protection, or cooling agent for the component elements of the ball joint 1, at the interface 8. The fluid F may consist of a liquid, emulsion, gel, oil, or paste, potentially charged with solid elements such as powders. The fluid F may also consist of a mixture of several fluids of different natures, in particular a mixture of at least two fluids chosen from among those listed above. As an example, the fluid F is an oil suited for lubricating the contact interface 8 between the rings 2 and 6 of the ball joint 1. In other words, the fluid F may be any type of active agent or mixture of agents suitable for the applications covered by the invention. The characteristics of the fluid F, in particular its viscosity, lubricating potential and/or cooling potential, are preferably chosen specifically for the targeted application.

The charge 40 is positioned in the housing 29 of the body 20, between the wall 23 of the base 22 and the wall 66 of the reservoir 60. The exact volume of the housing 29 occupied by the charge 40 depends on its composition, and therefore the targeted application. The rest of the housing 29 is occupied by air when the cover 26 covers the base 22. Alternatively, the charge 40 may occupy a more or less significant portion of the housing 29.

The charge 40 generates combustion gas when it burns above a predetermined temperature. Known from PCT '579 are thermally triggered charges, the ignition of which may result from an outside heat contribution or may be triggered by a remotely controlled ignition. Parameters such as the quantity and composition of the charge 40 influence the injection kinematics of the fluid F. The choice of the material for the base 22, in particular at the area Z24, also participates in controlling the response time the lapsing between the moment when critical heating of the ball joint 1 takes place, the moment of detection of that critical heating corresponding to ignition of the charge 40, and the injection moment of the fluid F into the ball joint 1.

As a practical example, if the critical temperature of the ball joint 1 is approximately 200° C., the charge 40 can be configured such that its ignition occurs at a temperature of 200° C., or slightly below the critical temperature, for example 195° C. In other words, the ignition of the charge can be triggered under the effect of a predetermined heat contribution relative to the critical temperature of the ball joint 1. Once the ignition is done, the charge 40 burns quickly, between several milliseconds and several seconds.

The management of the different aforementioned parameters makes it possible to set the formal triggering temperature, control the quantity of gas generated and the pressure of the gases before injection of the fluid, from several bars to several hundreds of bars, control the combustion time of the charge 40, and control the length and flow rate of delivery of the fluid F. The parameterization of the cartridge 10 may in particular be optimized to avoid premature injection of the fluid F due to untimely temperature spikes. In other words, an adjustable ignition delay of the charge 40 makes it possible not to trigger auto-triggering of the composition during periodic overheating of the ball joint 1 not characteristic of a malfunction, embodied by heating beyond the predetermined critical temperature.

The generation of combustion gases of the charge 40 may correspond to two primary embodiments. According to a first embodiment, the gas comes only from the combustion of a thermally triggered charge 40 generating gas, for example mixing thermite and gas-generating compounds. According to a second embodiment, the gas comes from the serial combustion of superimposed charges, which comprise variable portions of thermally triggered compounds under the effect of the heat contribution of the ball joint 1, gas-generating compounds, and compounds acting as ignition relays. For example, in this second embodiment, the charge 40 may comprise a first thermally triggered combustion stage, a second ignition relay stage, and a third combustion gas generating stage.

Preferably, the device 10 is autonomous, i.e. provided with no ignition controller. In that case, the ignition of the charge 40 is triggered only under the effect of the heat contribution, from the heating area Z24 of the body 20 toward the charge 40.

Alternatively, the device 10 may be equipped with a remote ignition control.

In practice, the pressure increase of the fluid F in the reservoir 60 is ensured by the membrane 68, the piston 72, and the combustion gases. The fluid F is released from the reservoir 60 when the membrane 68 is torn, when the pressure of the fluid F in the reservoir 60 increases above a predetermined pressure.

Figure 4:
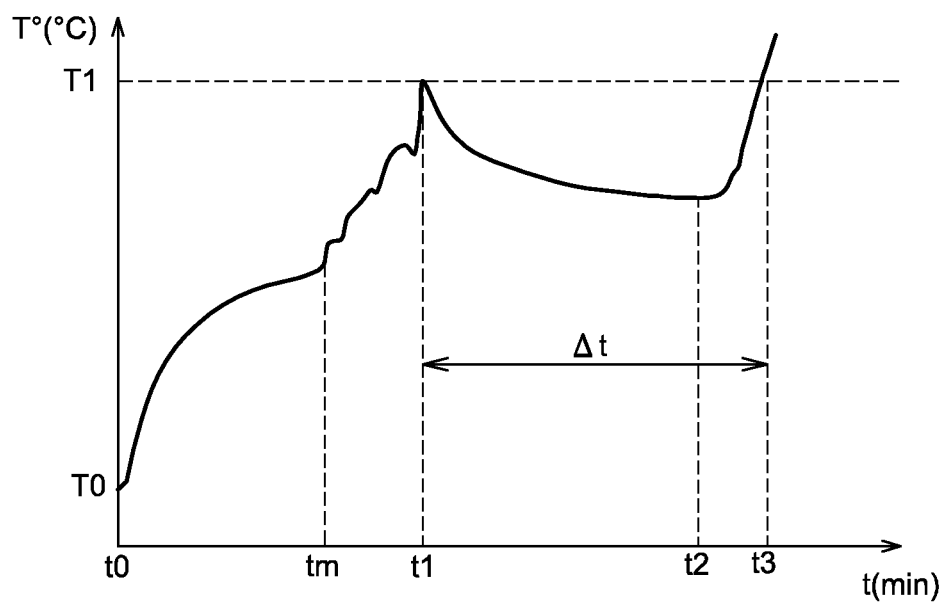
FIG. 4 is a graph illustrating the operation of the device of FIGS. 1 and 3.

Furthermore, a test bench may be used to test different parameterizations of the cartridge 10, during a preparatory phase for manufacture of the cartridge 10 that will ultimately be integrated into the ball joint 1, as explained hereafter relative to FIG. 4.

FIG. 4 shows a graph illustrating the operation of the cartridge 10 with a given parameterization.

To that end, the cartridge 10 is fastened on the ball joint 1, which in turn is mounted on a test bench, not shown for simplification purposes. The graph of FIG. 4 shows a temperature T° in degrees Celsius (° C.) of the ball joint 1 as a function of the time t in minutes (min). Preferably, the evolution of the temperature T° is measured at the interface 8 by a thermal camera connected to a computer, also not shown for simplification reasons.

In order to reproduce the targeted aeronautic applications, the test is conducted with a strong charge exerted on the ball joint 1, i.e. a contact pressure between the rings 2 and 6 comprised between 10 and 500 MPa, as well as an oscillation frequency varying from 10 to 35 Hz.

The rotation of the inner ring 6 starts at initial moment t0, where the interface 8 has a temperature TO corresponding to the ambient temperature and pressure conditions. The temperature T° increases rapidly in the ball joint 1 during operation, then more gradually, until a complete wear moment tm of the strip 9 and the appearance of the first bonds at the interface 8. The temperature T° continues to increase up to a moment t1 corresponding to a critical temperature T1 for triggering the cartridge 10. As one non-limiting example, the moment t1 occurs after approximately 30 minutes, while the critical temperature T1 is approximately 200° C. Between ignition of the charge 40 and injection of the fluid F into the ball joint 1, a duration in the vicinity of several seconds elapses, negligible on the scale of the graph. The heat divergence, reflecting the imminent seizing of the ball joint 1 by bonds, is stopped. The temperature T° drops again immediately and for several minutes, under the effect of the fluid F delivered to the interface 8 of the ball joint 1. Lastly, the temperature T° begins to increase again at a moment t2, where the fluid F is dissipated and/or its effects are no longer sufficient to prevent heating of the ball joint 1. At a moment t3, the temperature T° again reaches the temperature T1, but without a new injection of fluid F being possible.

At that stage, the readings indicate that the use of the cartridge 10 gave the ball joint 1 an operating suspension during an interval At of approximately 30 minutes, between the moments t1 and t2. In other words, the operating time of the ball joint 1 is doubled owing to the cartridge 10.

Furthermore, the deformable portion 27 has been pushed back toward the outside of the body 20 in the peripheral area Z50, under the action of the combustion gases. Thus, the combustion of the charge 40 is visually identified from outside the cartridge 10. The maintenance operator can therefore easily detect the fact that the cartridge 10 is henceforth inoperative and that the ball joint 1 has undergone critical heating.

FIG. 5 shows a second embodiment of a device 110 according to the invention.

More specifically, the device 110 is a miniaturized cartridge adapted to equip a mechanical system 1, for example the ball joint of the first embodiment.

Certain component elements of the cartridge 110 are comparable to the component elements of the cartridge 10 of the first embodiment, described above, and bear the same references increased by 100. These are the body 120 centered on an axis X110, the walls 123 and 124, the housing 129, the threaded sleeve 130, the thread 132, the film 134, the duct 136, the charge 140, the area Z150, the reservoir 160, the membrane 168, as well as the piston 172 for compressing the fluid F in the reservoir 160. The differences with respect to the first embodiment are primarily in the structure of the body 120 and the presence of an element 152 for visually signaling triggering of the charge 140.

The wall 124 of the body 120 forms an outer protruding shoulder relative to the wall 123, such that the heating area Z124 is more expansive than the areas Z24 of the first embodiment. Alternatively, the wall 124 may be more or less radially extended as a function in particular of the assembly constraints of the cartridge 110 on the system. At the membrane 168, the reservoir 160 bears against an inner shoulder 137 of the sleeve 130. The sleeve 130 is more elongated than the sleeve 30, without, however, distancing the membrane 168 from the outlet of the duct 136. When the cartridge 110 is made with a sleeve 130 that is even more elongated along the axis X110, the reservoir 160 can be elongated accordingly.

The body 120 does not include a cover 26 and deformable portion 27. The peripheral end area Z150, formed on the body 120 on the side opposite the bush 130, is provided with means for visually signaling the triggering of the charge 140. On the side of the area Z150, the housing 128 comprises a bore 127 having a larger diameter than the diameter of the rest of the housing 129. An annular groove 128 is formed in said bore 127. An annular seal 157 is positioned in the bore 127, then a substantially annular glazed element 152 is positioned against the seal 157. Another annular seal 158 is then positioned in the annular groove 128, such that the glazed element is housed between the seals 157 and 158. The state of the charge 140 and/or the combustion gases is thus transparently visible through the glazed element 152.

In other words, the combustion of the charge 40 may be detected visually from outside the cartridge 110 at the area Z150, for example during a maintenance operation. The glazed element 152 therefore constitutes an element for visually signaling combustion of the charge 140, visible at the area Z150 of the cartridge 100 after combustion of the charge 140.

Alternatively, the visual signaling means may be configured differently without going beyond the scope of the invention.

According to one alternative, the element 152 is not transparent, but made from a heat-sensitive material changing color in contact with the combustion gases.

According to another alternative, the visual signaling element is a capsule of paint or colored ink placed in the body 120, at the window 152 incorporated into the body 120 in the peripheral area Z150. The capsule then breaks under the pressure of the combustion gases, thereby releasing the paint or colored ink. This pressure can be direct or undergone through a moving element, for example a piston slidingly mounted in the body 120, between the window 152 and the reservoir 160.

FIG. 6 shows a third embodiment of the device 210 according to the invention.

More specifically, the device 210 is a miniaturized cartridge adapted to equip a mechanical system 1, for example the ball joint of the first embodiment.

Certain component elements of the cartridge 210 are comparable to the component elements of the cartridge 10 of the first embodiment, described above, and bear the same references increased by 200. These are the body 220 centered on an axis X210, the base 222, the radial wall 224, the cover 226, the housing 229, the threaded sleeve 230, the thread 232, the film 234, the charge 240, the area Z250, the reservoir 260, the membrane 268, and the piston 272 for compressing the fluid F in the reservoir 260.

The main difference with respect to the previous embodiments is that the cartridge 210 does not aim to protect the system 1, but only to signal heating of the system 1 beyond its critical temperature using visual means. Under these conditions, the cartridge 210 does not comprise a reservoir of fluid to be injected into the system. The radial wall 224 of the base 222 extends on either side of the axis X210 and separates the housing 229 and the sleeve 230.

However, the fluid F comprised in the reservoir 260 can be released outside the cartridge 210, in an outer peripheral area Z250 of the cover 226 of the cartridge 210, so as to signal triggering of the charge 240. The reservoir 260 bears on a shoulder 227 formed on the cover 226 at the area Z250. The inner surface of the cover 226 can grip the reservoir 260 on a larger or smaller surface, which reduces the volume of the housing 229 accordingly. For example, the reservoir 260 may fill the entire inner volume of the cover 226. The membrane 268 for delivering fluid F outside the reservoir 260 is directly inserted between the reservoir 260 and the peripheral area Z250, with an opening 228 formed in the cover 226. Alternatively, the cartridge 210 can comprise a duct in which the membrane 268 is positioned, said duct connecting the reservoir 260 to the area Z250.

The fluid F is preferably a paint or a colored ink, for example red paint easily identifiable by the maintenance operator. Thus, the combustion of the charge 240 can be detected visually from outside the cartridge 210 during a maintenance operation, simply by examining the area Z250 covered with paint. In other words, the fluid F constitutes an element for visually signaling combustion of the charge 240, said visual signaling element being visible at the outer peripheral area Z250 of the cartridge 210 after combustion of the charge 240.

Furthermore, all or some of the technical features of the different embodiments may be combined with each other. Thus, the signaling device and the mechanical system may be adapted to a particular application, in particular in terms of cost, bulk, and operational constraints.

According to one particular alternative combining the different embodiments, the device comprises a first reservoir containing a first signaling fluid provided to be released to the outside of the device, for example paint or colored ink, as well as a second reservoir containing a second fluid provided to be injected inside the mechanical system, for example grease or oil. The means for delivering the first fluid outside the first reservoir connect the first reservoir to the peripheral visual signaling area and can release the first pressurized fluid through the action, either direct or through a movable intermediate member in the first reservoir, of the combustion gases. The device also comprises means for delivering the second pressurized fluid outside the second reservoir through the action, either direct or through a second moving intermediate member in the second reservoir, of the combustion gases. In other words, the triggering of the charge causes delivery of the first fluid and the second fluid practically simultaneously. In that case, the visual signaling element is the first fluid, which is released at the peripheral area after combustion of the charge.

It will be noted that in the first and second embodiments, the means for signaling heating are distinct and at a distance from the reservoir and the fluid, whereas in the third embodiment and in the particular alternative described above, the signaling means comprise the fluid.

According to another alternative not shown, the cartridges can be positioned on the surfaces of the ball joints, on a housing formed in a tip body, or at any other point of the mechanical systems adapted to this application.

According to another alternative not shown, at least one positive braking element, for example of the sheet metal brake or lockwire type, may be integrated into the system 1. Each cartridge may be equipped with such an element, so as to prevent it from being unscrewed under the action of the vibrations during operation of the system 1. This element is complementary to the fastening means, i.e. the threaded sleeve and the anti-loosening adhesive film.

Depending on the embodiment, the invention can advantageously be implemented in the context of preventive maintenance, safety and/or protection of mechanical systems likely to undergo heating.

The invention claimed is:

1. A signaling device for signaling heating in a mechanical system susceptible to undergo contact heating during operation, for example an anti-friction bearing, a main bearing or a ball joint, the signaling device comprising:
   a body containing a thermally triggered charge generating combustion gas, ignition of the charge triggered under the effect of a predetermined heat contribution, by one of heating an area of the body toward the charge, or under the action of an ignition command,
   a reservoir containing a fluid, and
   a delivery device delivering pressurized fluid outside the reservoir through the action of combustion gases,
   wherein the signaling device also comprises at least one visual signaling element for visually signaling combustion of the charge, the visual signaling element being visible at an outer peripheral area of the signaling device after combustion of the charge.

2. The signaling device according to claim 1, wherein the visual signaling element is a part of the body deformable under the action of pressure inside the body, the deformable part pushed toward the outside of the body in the peripheral area by the combustion gases.

3. The signaling device according to claim 1, wherein the visual signaling element is a window arranged in the peripheral area, at least one of the charge and the combustion gases being visible through the window.

4. The signaling device according to claim 1, wherein the signaling element is made from a heat-sensitive material that changes color in contact with the combustion gases.

5. The signaling device according to claim 1, wherein the visual signaling element is a capsule of paint or colored ink arranged in the body, at a window incorporated into the body in the peripheral area, the capsule breaking against the window under the pressure, by at least one of direct or through a moving element, from the combustion gases.

6. The signaling device according to claim 1, wherein the delivery device delivering fluid outside the reservoir are inserted between the reservoir and the peripheral area and wherein the visual signaling element is the fluid that is released at the peripheral area after combustion of the charge.

7. The signaling device according to claim 6, wherein the fluid is a paint or a colored ink.

8. The signaling device according to claim 6, further comprising:
   a second reservoir containing a second fluid, and
   a secondary delivery device delivering the second pressurized fluid outside the second reservoir through at least one of direct action or through a second intermediate member movable in the second reservoir, of the combustion gases.

9. The signaling device according to claim 1, wherein the signaling device is autonomous, the ignition of the charge being triggered only under the effect of a heat contribution, from a heating area of the body, toward the charge.

10. The signaling device according to claim 1, wherein the delivery device delivering the pressurized fluid outside the reservoir comprises a non-fragmentable membrane, which initially closes off the reservoir and breaks when the pressure of the fluid in the reservoir exceeds a predetermined pressure threshold.

11. The signaling device according to claim 1, further comprising a fastener fastening the signaling device to a mechanical system, the fastener comprising at least one sleeve provided with an outer thread coated with an anti-loosening adhesive film.

12. The signaling device according to claim 11, wherein the fastener is adapted to at least one of put the reservoir in fluid communication with the mechanical system and to position the body against the mechanical system at the heating area.

13. The signaling device according to claim 11, wherein the injection sleeve comprises a material having a 0.2% deformation yield strength $Re_{0.2}$ comprised between 500 and 700 MPa, and a tensile strength Rmax comprised between 700 and 900 MPa.

14. A mechanical system, susceptible to undergo contact heating during operation, at least one of an anti-friction bearing, a main bearing or a ball joint, wherein the system comprises at least one signaling device according to claim 11, the sleeve of the signaling device being screwed into a tapped orifice formed in the mechanical system.

15. The mechanical system according to claim 14, wherein the tapped orifice is formed in a part of the system made from a steel having a tensile strength comprised between 2400 and 2600 megapascals (MPa).

16. The mechanical system according to claim 14, wherein at least one positive braking element cooperating with a signaling device is integrated into the mechanical system.

17. The mechanical system according to claim 16, wherein the positive braking element is of the sheet metal brake type.

18. The mechanical system according to claim 16, wherein the positive braking element is of the lockwire type.

19. A mechanical system, susceptible to undergo contact heating during operation, at least one of an anti-friction bearing, a main bearing, or a ball joint, wherein the system comprises at least one signaling device according to claim 1.

20. The mechanical system according to claim 19, wherein at least one positive braking element cooperating with a signaling device is integrated into the mechanical system.

* * * * *